(12) United States Patent
Gandhi

(10) Patent No.: US 9,836,091 B2
(45) Date of Patent: Dec. 5, 2017

(54) SHOCK MOUNT FOR CIRCUIT BOARD

(75) Inventor: Dinesh Gandhi, Brampton (CA)

(73) Assignee: Psion, Inc., Mississauga (CA)

( * ) Notice: Subject to any disclaimer, the term of this patent is extended or adjusted under 35 U.S.C. 154(b) by 668 days.

(21) Appl. No.: 12/765,992

(22) Filed: Apr. 23, 2010

(65) Prior Publication Data

US 2011/0261528 A1   Oct. 27, 2011

(51) Int. Cl.
*G06F 1/16* (2006.01)
*G06K 7/10* (2006.01)

(52) U.S. Cl.
CPC ......... *G06F 1/1658* (2013.01); *G06F 1/1626* (2013.01)

(58) Field of Classification Search
USPC ............. 361/807–812, 679.01, 679.02, 361/679.55–679.59, 679.27; 345/156, 345/157, 168, 169, 184; 455/325, 556.1, 455/550.1, 90.1, 575.1; 369/282, 291, 369/253, 44.16, 75.5
See application file for complete search history.

(56) References Cited

U.S. PATENT DOCUMENTS

| | | | |
|---|---|---|---|
| 5,479,285 A * | 12/1995 | Burke | 349/58 |
| 6,470,175 B1 * | 10/2002 | Park et al. | 455/90.1 |
| 7,195,168 B2 | 3/2007 | Wulff | |
| 2010/0112949 A1 * | 5/2010 | Kim et al. | 455/41.3 |

* cited by examiner

*Primary Examiner* — Jerry Wu

(57) ABSTRACT

A shock mount assembly is provided for mounting a circuit board in a housing of a handheld computer. The shock mount assembly comprises a frame, configured to receive the circuit board, and a clamp, configured to secure the frame to the housing. The frame comprises a plurality of tabs, each of the tabs sheathed in a shock-absorbent material and configured to be received by corresponding pockets in the housing. The clamp comprises receiving portions shaped to receive a corresponding tab of the frame. When the frame is secured to the housing by the clamp, the pocket of the housing and the receiving portion of the clamp encapsulate the corresponding tab of the frame, thereby restricting its movement. A frame and a housing are also provided.

13 Claims, 5 Drawing Sheets

SHOCK MOUNT FOR CIRCUIT BOARD

The present invention relates generally to circuit boards and specifically to a system and method for shock mounting circuit boards in an electronic device.

BACKGROUND

Given the proliferation of handheld mobile computing devices, ruggedization has become an important factor in enhancing their usefulness. It is expected that handheld or mobile devices will be dropped from time to time during handling in normal usage, for instance. This introduces an additional factor of vulnerability. To the extent that the handheld device may be made more robust and reliable when subjected to inadvertent physical abuse in normal usage, the utility to a user of such devices is enhanced.

When the handheld device is dropped and impacts the ground, or other surface, the shock is absorbed by the handheld device and transferred to its internal components, including the circuit board. As a result of the shock, components on the circuit board can become loose or dislodged, resulting in permanent or intermittent errors during operation of the handheld device. Accordingly, it is desirable to reduce the amount of shock absorbed by the circuit board as a result of the impact.

U.S. Pat. No. 7,195,168, titled "Terminal Design with Shock Isolation Assembly", addresses the issue of shock absorption. In the patent, a circuit board is encapsulated by a rigid frame. A rubber bumper is provided between the rigid frame and a housing of a handheld device. Accordingly, in case the handheld device is dropped, the rubber bumper absorbs some of the impact, and the rigidity of the frame cause the circuit board to maintain a generally planar configuration.

However, the solution proposed by the patent is bulky. At a time when the general trend is towards smaller, more lightweight devices, a more lightweight solution is desirable.

SUMMARY

In accordance with an aspect of the present invention, there is provided a shock mount assembly for mounting a circuit board in a housing of a handheld computer, the shock mount assembly comprising: a frame configured to receive the circuit board, the frame comprising a plurality of tabs, each of the tabs sheathed in a shock-absorbent material and configured to be received by corresponding pockets in the housing; and a clamp configured to secure the frame to the housing, the clamp comprising receiving portions shaped to receive a corresponding tab of the frame; wherein when the frame is secured to the housing by the clamp, the pocket of the housing and the receiving portion of the clamp encapsulate the corresponding tab of the frame, thereby restricting its movement.

In accordance with a further aspect of the present invention there is provided a frame configured to support a circuit board for mounting in a housing of a handheld computer, the frame comprising a plurality of tabs, each of the tabs sheathed in a shock-absorbent material and configured to be received by corresponding pockets in the housing.

In accordance with yet a further aspect of the present invention there is provided a housing of a handheld computer for receiving a circuit board mounted on a frame, the housing comprising: a plurality of pockets configured to receive a corresponding plurality of tabs of the frame, each of the tabs sheathed in a shock-absorbent material, a receiving means configured to secure the frame to the housing using a clamp; and a plurality of stops configure to restrict motion of the frame within the housing.

BRIEF DESCRIPTION OF THE DRAWINGS

Embodiments of the invention will now be described by way of example only with reference to the following drawings in which.

DETAILED DESCRIPTION OF THE PREFERRED EMBODIMENTS

Figure 1:
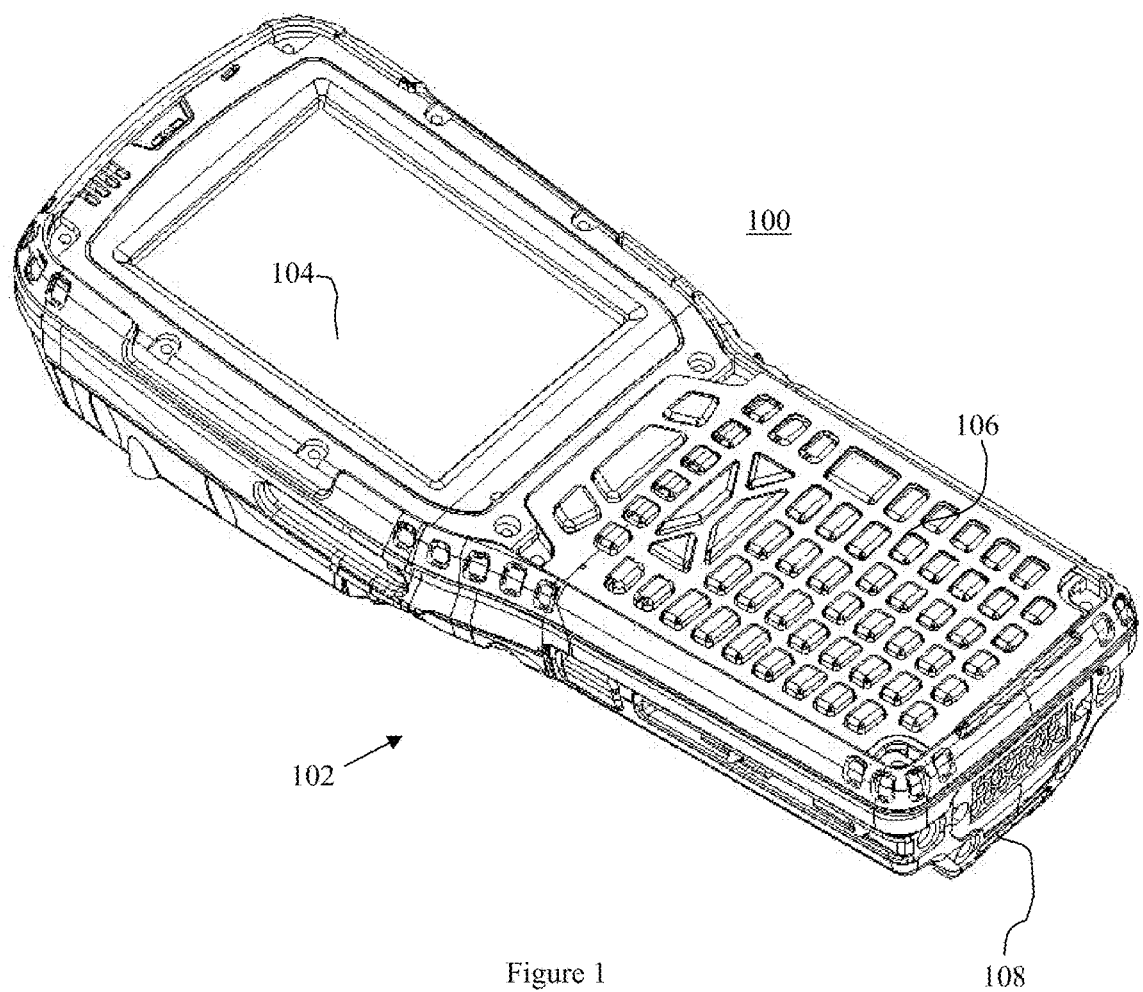
FIG. 1 is a diagram of a sample mobile computer.

For convenience, like numerals in the description refer to like structures in the drawings. Referring to FIG. 1 a mobile computer (herein referred to variously and interchangeably as a handheld device, a handheld computer, or a mobile device) is shown generally by numeral 100. The mobile computer 100 comprises a main body 102, a display 104, a keyboard 106 and a battery compartment 108 for housing a rechargeable battery (not shown). Additionally, in the present embodiment, the mobile computer 100 has the capability of wireless communicating data and/or voice, to and from servers as well as data acquisition sources within a communication network. One or more circuit board are housed within the mobile computer 100 for providing the electronic components required to implement at least a portion of the functionality provided by the mobile computer 100.

Figure 2:
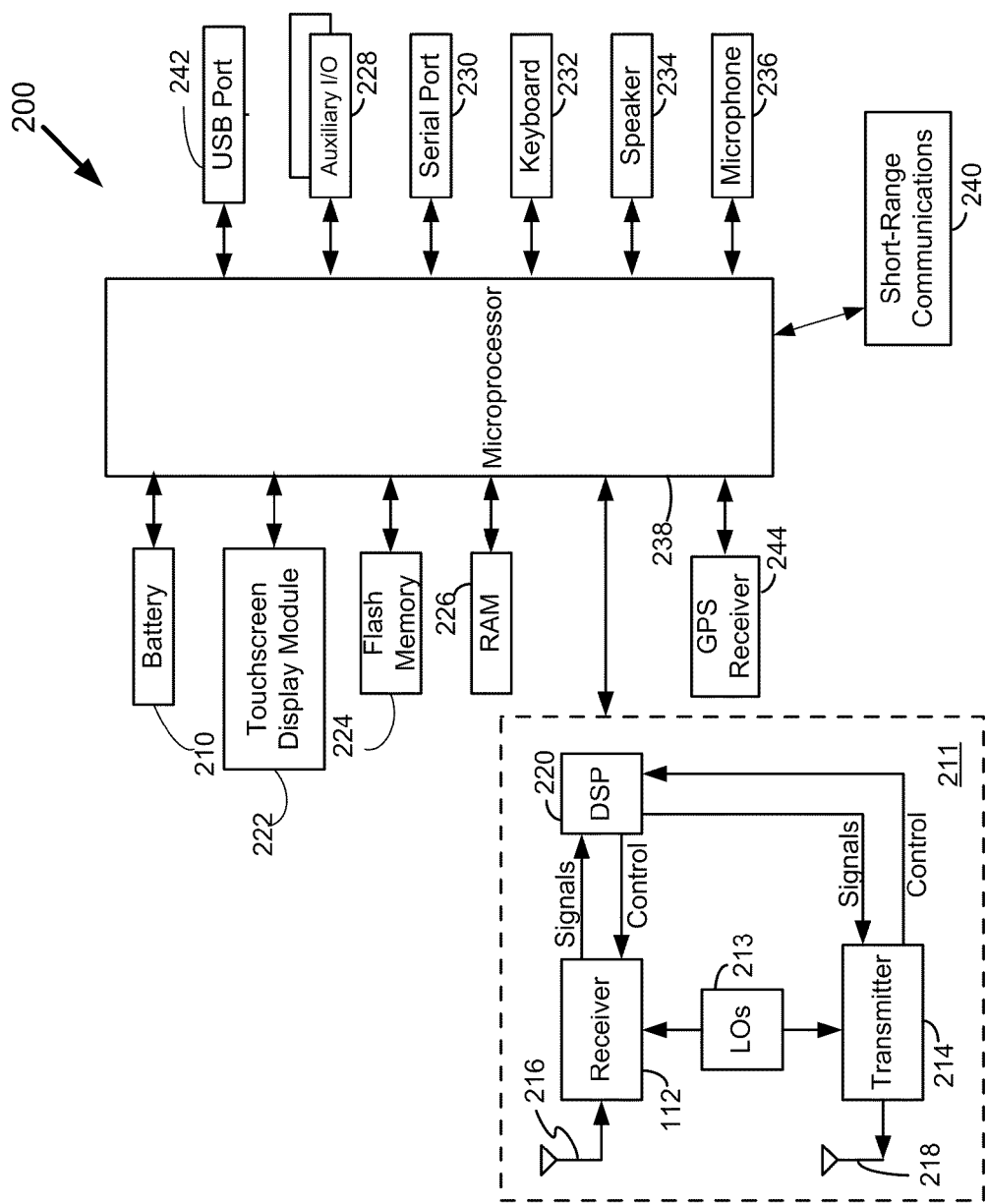
FIG. 2 is a is a block diagram illustrating the functionality provided by a circuit board.

Referring to FIG. 2, a block diagram illustrating an example of the functionality provided the circuit board is shown generally by numeral 200. The circuit board 200 includes a microprocessor 238, which controls general operation of the mobile computer 100. The microprocessor 238 also interacts with functional device subsystems such as a communication subsystem 211, display module 222, a flash memory 224, random access memory (RAM) 226, auxiliary input/output (I/O) subsystems 228, serial port 230, keyboard 232, speaker 234, microphone 236, short-range communications subsystem 240 such as Bluetooth™ for example, and Universal Serial Bus (USB) expansion port 242 for peripherals. The mobile computer 100 may include a power source 210, such as a rechargeable battery which may also be removable and replaceable from the mobile computer. The mobile computer 100 may also include a positioning device 244, such as a GPS receiver for example, for receiving positioning information.

Operating system software used by the microprocessor 238 may be stored in a persistent store such as the flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

The microprocessor 238, in addition to its operating system functions, enables execution of software applications on the mobile computer 100. A predetermined set of applications, which control basic device operations, may be installed on the mobile computer 100 during its manufacture. These basic operations typically include data and voice communication applications, for example. Additionally, applications may also be subsequently loaded onto the handheld device 100 through the communication subsystem 211, an auxiliary I/O subsystem 228, serial port 230, USB port 242, short-range communications subsystem 240, or any other suitable subsystem, and installed by a user in RAM 226, or the persistent store 224, for execution by the microprocessor 238. Such flexibility in application installation increases the functionality of the handheld device 100 and may provide enhanced on-device features, communication-related features, or both.

The radio frequency (RF) communication subsystem 211, includes a receiver 212, a transmitter 214, and associated components, such as one or more embedded or internal antenna elements 216 and 218, local oscillators (LOs) 213, and a processing module such as a digital signal processor (DSP) 220. As will be apparent to those skilled in field of communications, the particular design of the RF communication subsystem 211 depends on the communication network in which mobile computer 100 is intended to operate, but may include communication functionalities such as radio-frequency identification (RFID), Wi-Fi WLAN based on 802.11 standards, and the like.

The display module 222 is used to visually present an application's graphical user interface (GUI) to the user. Depending on the type of mobile computer 100, the user may have access to various types of input devices, such as, for example, a scroll wheel, trackball, light pen and/or a touch sensitive screen.

Figure 3:
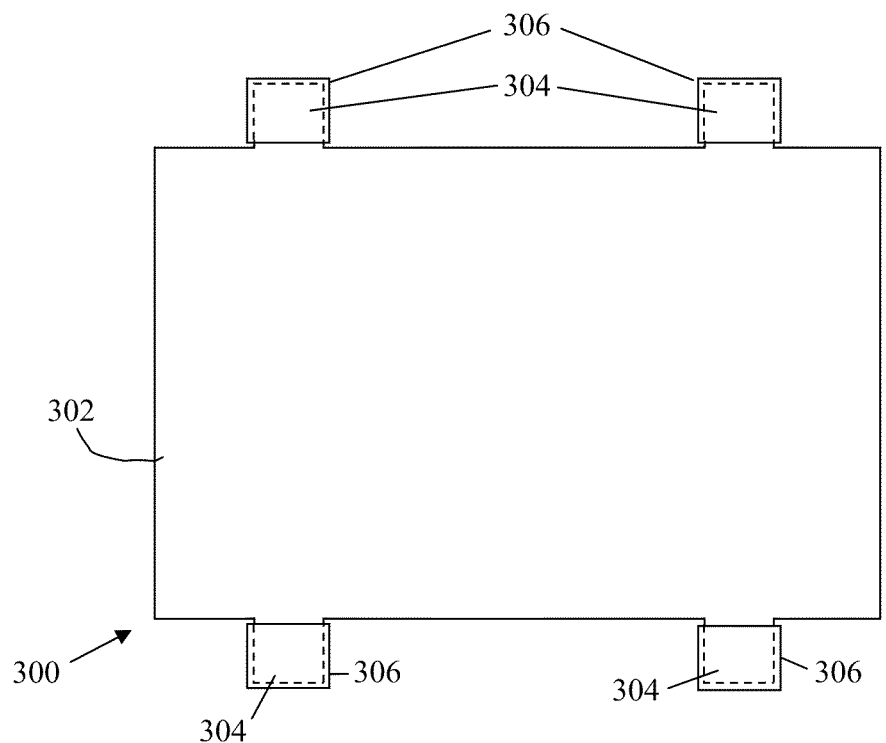
FIG. 3 is a block diagram illustrating a frame for mounting the circuit board.

In the present embodiment, the circuit board is mounted onto a metal frame in order to be attached to the main body 102 of the mobile computer 100. Referring to FIG. 3, the frame is illustrated generally by numeral 300. The frame 300 comprises a main body 302 onto which the circuit board is to be mounted. The frame 300 further comprises a plurality of tabs 304. In the present embodiment, four tabs 304 are provided on the frame 300, with two tabs 304 on each side of the frame 300. In the present embodiment, the tabs 304 are positioned away from the corners of the frame 300. Each of the tabs 304 comprises a projection of the frame 300 covered by a rubber sleeve 306. In the present embodiment, each rubber sleeve 306 is substantially rectangular.

Figure 4:
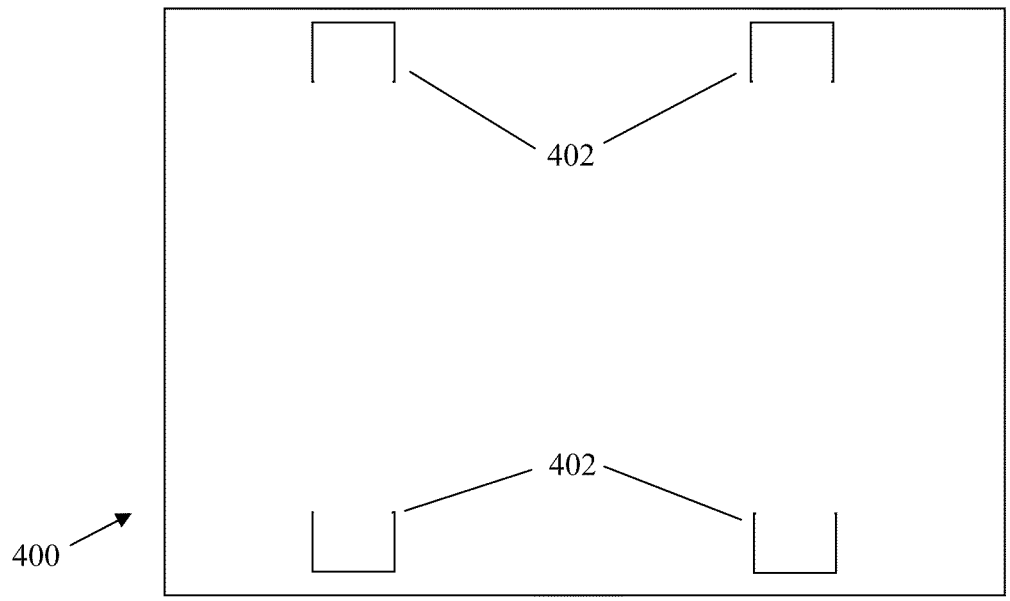
FIG. 4 is a block diagram illustrating pockets in the housing.

Referring to FIG. 4, a housing of the main body 102 is illustrated generally by numeral 400. The housing is configured to include a plurality of pockets 402. In the present embodiment, four pockets 402 are provided in the housing 400, with two pockets 402 on each side of the housing 400. The pockets 402 have the edges such that they are c-shaped when view from above and in cross-section. Each pocket 402 is configured to receive a corresponding tab 302 of the frame 300 when the frame 300 is place in the housing 400.

Figure 5:
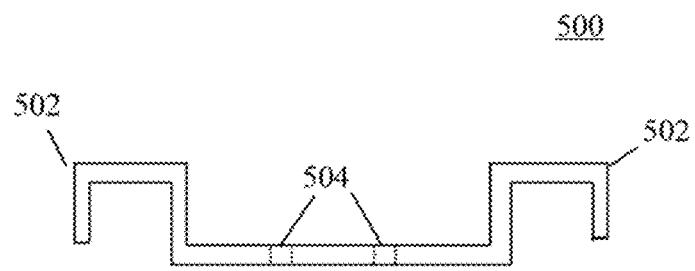
FIG. 5 is a block diagram of a clamp used to secure the frame to the housing.

Referring to FIG. 5, a clamp is illustrated generally by numeral 500. Each end 502 of the clamp 500 is shaped to encapsulate a top portion of the tabs 304. Accordingly, in the present embodiment each end 502 of the clamp 500 is c-shaped. The clamp 500 further includes securing means 504 for securing the clamp to the housing 400. In the present embodiment, the securing means are screw-holes that are configured to align with screw-holes in the housing 400. The screw-holes in the housing include an internal thread for receiving a screw. Other securing means 504, such as a nut and bolt or other standard mean for securely attaching two metal objects, can be implemented. In the present embodiment, two clamps 500 are used to secure the frame 300 to the housing 400, one for each side.

Figure 6A:
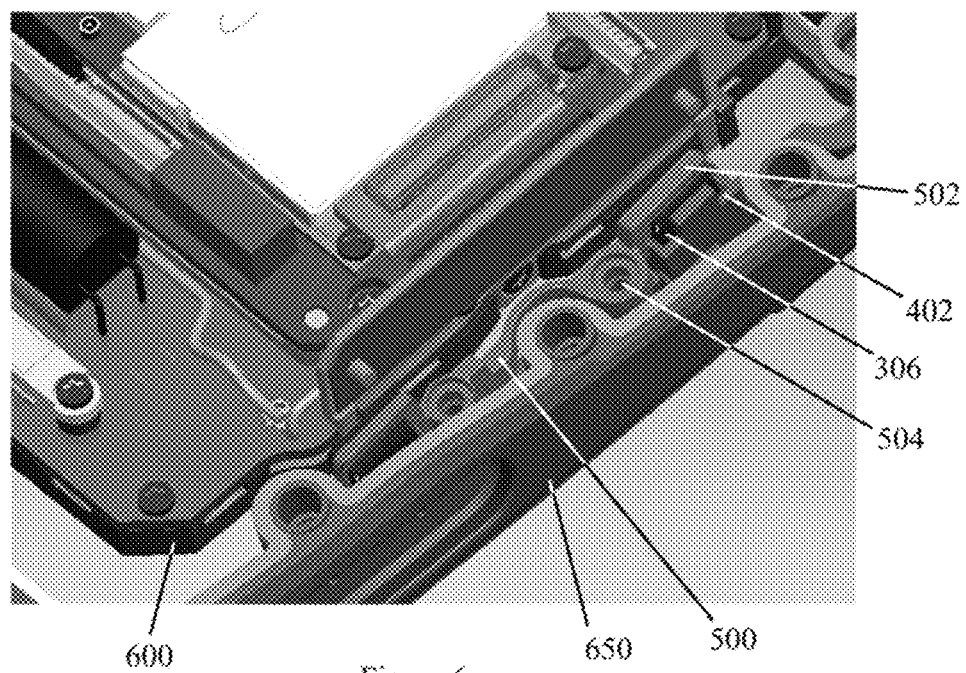
FIG. 6a is an isometric view illustrating the frame secured to the housing.
Figure 6B:
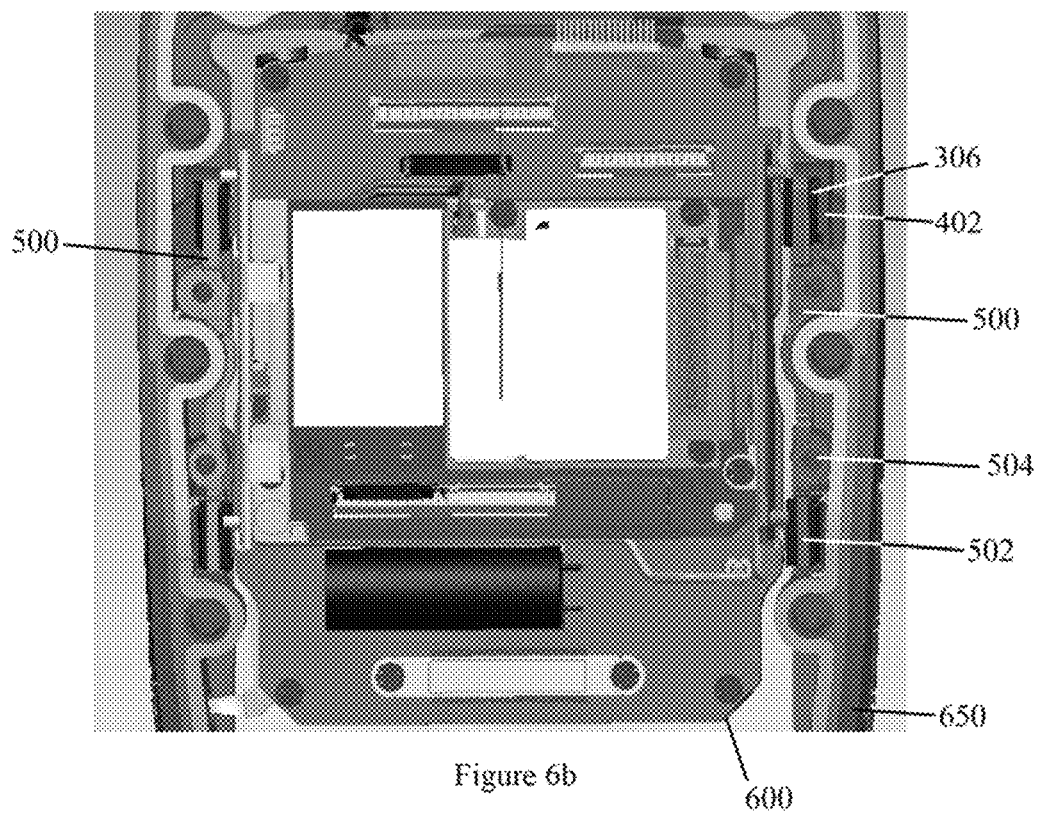
FIG. 6b is a plan view illustrating the frame secured to the housing.

Referring to FIGS. 6a and 6b, an illustration of the frame 300 attached to the housing 400 is shown generally by numerals 600 and 650 respectively. The frame 300 is placed in the housing 400 such that each of the rubber sleeves 306 of the frame 300 engages a corresponding pocket 402 of the housing 400. Each rubber sleeve 306 is sized to fit snugly in the c-shaped pocket 402.

One clamp 500 is placed on the housing 400 such that each end 502 of the clamp 500 engages a corresponding rubber sleeve 306 as it sits in the pocket 402 of the housing 400. Each rubber sleeve 306 is sized to fit snugly in the c-shaped end 502 of the clamp 500. The clamp 500 is held in place by securing directly to the housing. In the present embodiment, this is achieved by inserting screws through the screw-holes 504 and fastening them to the screw-holes in the housing 400. Accordingly, it will be appreciated that each c-shaped pocket 402 and corresponding end 502 of the clamp 500 encapsulates the rubber sleeve 306, restricting its movement.

It will be appreciated that the rubber sleeves 306 absorb at least a portion of the impact when the main body 102 is dropped, thereby protecting the circuit board. Further, because the circuit board is not in contact with the housing 400 along its entire periphery, the effect of the impact on the circuit board is lessened.

Although the specific implementations of the invention are described above, a person of ordinary skill in the art will appreciate that various modifications can be made without detracting from the spirit of the invention.

For example, the embodiment described above illustrates four tabs 304, two on each side of the frame 300. However, the four tabs 304 can be arranged with one tab 304 on each side of the frame 300. Alternatively, there could be more, or less, than four tabs 304. For example, six tabs could be used, with four tabs 304 along the length of the frame 300 and two tabs 304 along the width of the frame 300. Various other embodiments will be apparent to a person skilled in the art.

In another example, the embodiment described above teaches a substantially rectangular rubber sleeve 306, a c-shaped pocket 402 and a c-shaped clamp end 502. However, as described above, this configuration is designed to restrict movement of the frame 300 once it has been connected to the housing 400. Accordingly, the shape of the pocket 402, the clamp end 502 and the rubber sleeve 306 may vary as long as the frame 300 can be sufficiently secured to the housing 400 by the clamp 500. Accordingly, various shapes and configurations will be apparent to a person of ordinary skill in the art.

Figure 7:
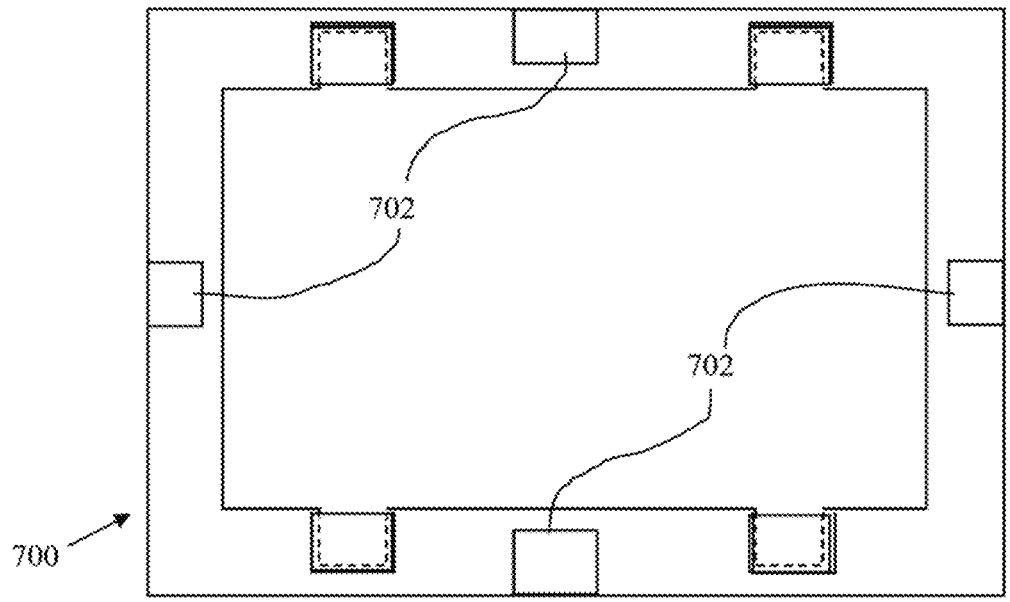
FIG. 7 is a block diagram illustrating stops in the housing.

Although it is desirable to allow some movement of the frame 300 to help absorb the impact of a drop, too much movement may also cause undesirable damage to circuit board, frame, housing, or a combination thereof Referring to FIG. 7, an alternate embodiment of the housing with the frame in place illustrated generally by numeral 700. In the present embodiment, hard or semi-hard plastic stops 702 are added to the housing 400 to inhibit motion of the frame 300. The material of the stops should be hard enough to inhibit any significant further movement of the frame. In the present embodiment one stop 702 is provided for each of the six axes of potential travel. That is, the stops 702 are arranged on all four sides as well as above and below the frame.

Further, the stops 702 are configured to abut the frame 300 and not the circuit board to inhibit damaging the circuit board itself.

More or fewer stops may also be implemented. The distance each of the stops 702 is offset from the frame 300 can be uniform or vary for each of the six axes, depending on the implementation. Generally, the distance each stop is offset is the maximum distance before adverse effects of movement are realized. Thus, for bigger impacts, the stops 702 reduce excess movement of the frame 300.

In another example, the embodiment described above refers to a rubber sleeve. However, since the purpose of the sleeve is to absorb vibrations due to impact on the main body 102 other impact absorbing materials, can be used.

In another embodiment, the tabs may not be covered by an impact absorbing material at all. In this example, the tabs 204 can be affixed to the housing 400 using screws. The positioning of the tabs away from the corners of the housing 400 may provide sufficient shock absorption by allowing the frame 300 to flex upon impact.

Therefore, although the invention has been described with reference to certain specific embodiments, various modifications thereof will be apparent to those skilled in the art without departing from the scope of the invention as defined by the appended claims.

What is claimed is:

1. A shock mount assembly for mounting a circuit board in a housing of a computer, the shock mount assembly comprising:
    a metal frame configured to receive the circuit board, the frame having a length and a width, the length being longer than the width, the frame comprising a plurality of tabs, each of the tabs sheathed in a shock-absorbent material and configured to be received by a different pocket of a plurality of pockets in the housing, each of the tabs positioned on a side of the frame along the length of the frame away from the corners of the frame by at least a length of the tab; and
    a clamp configured to secure the frame to the housing, the clamp comprising two receiving portions each shaped to receive one of the plurality of tabs of the frame, the two receiving portions of the clamp being located at opposing ends of the clamp;
    wherein when the clamp is secured to the housing, two of the plurality of pockets of the housing and the two receiving portions of the clamp engaging the shock-absorbent material sheathing two of the plurality of tabs and thereby restricting a movement of the frame relative to the housing.

2. The shock mount assembly of claim 1, wherein the frame comprises four tabs.

3. The shock mount assembly of claim 2, wherein two of the four tabs are located on one side of the frame and two of the four tabs are located on an opposite side of the frame.

4. The shock mount assembly of claim 1, wherein the shock-absorbent material is rubber.

5. The shock mount assembly of claim 1, wherein the pockets in the housing and the receiving portions of the clamp are c-shaped.

6. The shock mount assembly of claim 1, wherein the housing further includes a plurality of stops configured to restrict movement of the frame within the housing.

7. The shock mount assembly of claim 6, wherein the stops are configured in each of the six axes of potential movement.

8. The shock mount assembly of claim 6, wherein the stops comprise a hard plastic or a semi-hard plastic.

9. A frame configured to support a circuit board for mounting in a housing of a computer, the frame having a length and a width, the length being longer than the width, the frame comprising:
    a plurality of tabs, each of the tabs positioned on a side of the frame along the length of the frame away from the corners of the frame by at least a length of the tab,
    each of the tabs sheathed in a shock-absorbent material and configured to be received by a different pocket of a plurality of pockets in the housing and
    each pocket of the housing and a receiving portion of a clamp secured to the housing engaging the shock-absorbent material sheathing a different one of the tabs and thereby restricting a movement of the frame relative to the housing, the clamp being secured against the housing.

10. The frame of claim 9, wherein the frame comprises four tabs.

11. The frame of claim 10, wherein two of the four tabs are located on one side of the frame and two of the four tabs are located on an opposite side of the frame.

12. The frame of claim 9, wherein the clamp is configured to be attached to the housing via a screw.

13. The frame of claim 12, wherein the shock-absorbent material is rubber.

\* \* \* \* \*